United States Patent
Kim (10) Patent No.: US 8,233,363 B2
(45) Date of Patent: Jul. 31, 2012

(54) METHOD OF CONTROLLING RECORDING OPERATION AND OPTICAL DISC DRIVE EMPLOYING THE METHOD

(75) Inventor: Sang-whook Kim, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 12/844,933

(22) Filed: Jul. 28, 2010

(65) Prior Publication Data

US 2011/0038240 A1 Feb. 17, 2011

(30) Foreign Application Priority Data

Aug. 14, 2009 (KR) .................. 10-2009-0075431

(51) Int. Cl.
*G11B 5/00* (2006.01)
*G11B 7/12* (2006.01)

(52) U.S. Cl. ............................................. 369/47.5
(58) Field of Classification Search ........... 369/47.5, 369/47.51, 47.53, 59.1–59.25
See application file for complete search history.

(56) References Cited

U.S. PATENT DOCUMENTS

| 6,563,775 B2 * | 5/2003 | Sato .................. 369/47.53 |
| 2005/0185537 A1 * | 8/2005 | Ninomiya ............ 369/44.33 |
| 2006/0239166 A1 | 10/2006 | Yu |
| 2009/0141601 A1 * | 6/2009 | Wada ................. 369/47.53 |

FOREIGN PATENT DOCUMENTS

| KR | 10-2004-0002366 | 1/2004 |
| KR | 10-0723536 | 5/2007 |
| KR | 10-2008-0060464 | 7/2008 |

* cited by examiner

*Primary Examiner* — Joseph Feild
*Assistant Examiner* — Nicholas Lee
(74) *Attorney, Agent, or Firm* — NSIP Law (57) ABSTRACT

Provided are a method of controlling a recording operation in an optical disc drive to improve recording quality and an optical disc drive employing the method. The method includes setting recording power and parameters related to the generation of recording pulses by successively performing an optimum power controlling (OPC) process for adjusting recording power and an optimum write strategy (WST) tuning control (OWC) process for adjusting parameters related to the generation of recording pulses. The method also includes performing data recording based on the set recording power and the set parameters related to the generation of recording pulses.

26 Claims, 5 Drawing Sheets

METHOD OF CONTROLLING RECORDING OPERATION AND OPTICAL DISC DRIVE EMPLOYING THE METHOD

CROSS-REFERENCE TO RELATED PATENT APPLICATION(S)

This application claims the benefit under 35 U.S.C. §119(a) of Korean Patent Application No. 10-2009-0075431, filed on Aug. 14, 2009, in the Korean Intellectual Property Office, the entire disclosure of which is incorporated herein by reference for all purposes.

BACKGROUND

1. Field

The following description relates to a method of controlling a disc drive and a disc drive employing the same, and more particularly, to a method of controlling a recording operation in an optical disc drive to improve recording quality and an optical disc drive employing the method.

2. Description of the Related Art

Generally, discs used as recording media for optical disc drives may be categorized into playback only optical discs, such as compact disc-read only memory (CD-ROM), one-time recordable optical discs, such as CD-recordable (CD-R), and rewritable optical discs, such as CD-rewritable (CD-RW), based on an intended purpose. Such discs with particular purposes have been widely used. Furthermore, as larger capacity discs, such as digital versatile discs (DVDs), are developed, optical discs are being developed as recording media used not only for recording PC data, but also for recording various video and audio data.

Accordingly, there is a demand to develop techniques for controlling data recording with optical discs to provide high recording quality.

SUMMARY

In one general aspect, there is provided a method of controlling a recording operation, the method comprising: setting recording power and parameters related to the generation of recording pulses by successively performing: an optimum power controlling (OPC) process for adjusting recording power; and an optimum write strategy (WST) tuning control (OWC) process for adjusting parameters related to the generation of recording pulses; and performing data recording based on the set recording power and the set parameters related to the generation of recording pulses.

The method may further include that the OPC process and the OWC process are performed before data is recorded.

The method may further include that the OPC process and the OWC process are successively performed prior to or during a recording operation.

The method may further include that the data recording is temporarily stopped, recording quality is evaluated, and the OPC process and the OWC process are successively performed at every initially set interval.

The method may further include that the initial WST, which is initially set before recording power and parameters related to the generation of recording pulses are adjusted, is determined based on the identification (ID) of a disc to which data is to be recorded.

The method may further include that the OWC process is performed only when recording quality is below a critical recording quality.

The method may further include that the recording quality is evaluated based on error rate or jitter detected by reproducing signals recorded in a disc.

The method may further include that parameters related to recording power are adjusted based on a result of a comparison between recording power calculated based on a reproduced signal and target recording power during the OPC process.

The method may further include that the recording power is calculated by using a factor indicating the vertical symmetry of the waveform of a reproduced signal, which is proportional to the intensity of light reflected by a disc.

The method may further include that only parameters related to timings of recording pulses are adjusted when the OWC process is performed during data recording.

The method may further include that the OWC process is performed in correspondence to a recording speed.

In another general aspect, there is provided a computer-readable storage medium having recorded thereon a computer program for implementing a method, comprising: setting recording power and parameters related to the generation of recording pulses by successively performing: an optimum power controlling (OPC) process for adjusting recording power; and an optimum write strategy (WST) tuning control (OWC) process for adjusting parameters related to the generation of recording pulses; and performing data recording based on the set recording power and the set parameters related to the generation of recording pulses.

In another general aspect, there is provided an optical disc drive, comprising: a memory configured to store information regarding recording power and optimum write strategy (WST); and a system control unit configured to control the optical disc drive to: set recording power and parameters related to the generation of recording pulses by successively performing, prior to or during a recording operation: an optimum power controlling (OPC) process for adjusting recording power; and the WST tuning control (OWC) process for adjusting parameters related to the generation of recording pulses; and perform data recording based on the set recording power and the set parameters related to the generation of recording pulses.

The optical disc drive may further include that the system control unit comprises: a WST tuning control module configured to adjust parameters related to the generation of recording pulses based on recording quality; and an OPC module configured to compare recording power calculated based on a reproduced signal to target recording power and adjust recording power based on a result of the comparison.

The optical disc drive may further include that first group WST information is initially tuned based on one or more of: universal disc identifications (IDs), second group WST information regarding non-universal discs, and default WST information that are classified and stored in the memory.

The optical disc drive may further include that the system control unit is further configured to: read out WST information corresponding to an identification (ID) of a disc, to which data is to be recorded, from the memory; and initially set parameters related to the generation of recording pulses before data is recorded in the disc.

The optical disc drive may further include that, in response to WST information corresponding to a disc ID read out from a disc to which data is to be recorded not being stored in the memory, the system control unit is further configured to: read out default WST information from the memory; and initially set parameters related to the generation of recording pulses.

The optical disc drive may further include that the OWC process is performed only when recording quality is below a critical recording quality.

The optical disc drive may further include that the recording quality is evaluated based on error rate or jitter detected by reproducing signals recorded in a disc.

The optical disc drive may further include that parameters related to recording power are adjusted based on a result of comparison between recording power calculated based on a reproduced signal and target recording power during the OPC process.

The optical disc drive may further include that the recording power is calculated by using a factor indicating the vertical symmetry of the waveform of a reproduced signal, which is proportional to the intensity of light reflected by a disc.

The optical disc drive may further include that only parameters related to timings of recording pulses are adjusted when the OWC process is performed during data recording.

The optical disc drive may further include that the OWC process is performed in correspondence to a recording speed.

The optical disc drive may further include that WST with respect to a disc to which the OWC process is performed is stored in the memory only when the disc is not a universal disc.

Other features and aspects may be apparent from the following detailed description, the drawings, and the claims.

Throughout the drawings and the detailed description, unless otherwise described, the same drawings reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also descriptions of well-known functions and constructions may be omitted for increased clarity and conciseness.

Figure 1:
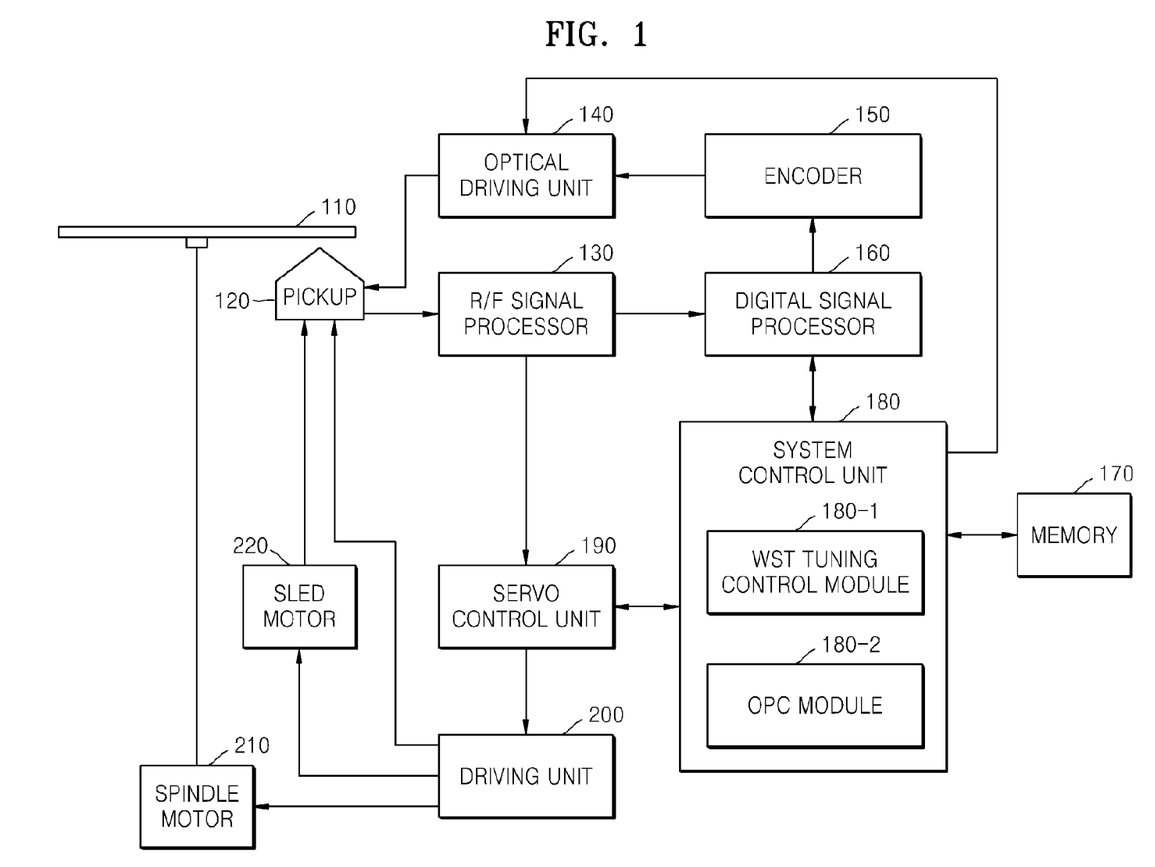
FIG. 1 is a diagram illustrating an example of an optical disc drive.

As shown in FIG. 1, one example of the optical disc drive includes a disc 110, a pickup 120, a R/F signal processor 130, an optical driving unit 140, an encoder 150, a digital signal processor (DSP) 160, a memory 170, a system control unit 180, a servo control unit 190, a driving unit 200, a spindle motor 210 and a sled motor 220.

The disc 110, which is a recording medium that may be used in an optical disc drive, may be, for example, a compact disc (CD), a digital versatile disc (DVD), a Blu-ray Disc (BD), or the like.

The pickup 120 may project a laser beam according to optical driving signals generated by the optical driving unit 140 onto the disc 110 and detecting optical signals reflected from the disc 110.

The R/F signal processor 130 generates a focus error signal, a tracking error signal, and a signal processing signal by combining signals detected by the pickup 120. Then, the R/F signal processor 130 filters and equalizes the signal processing signal, converts the equalized and standardized signal processing signal into a binary signal, and outputs the binary signal to the DSP 160.

In a recording mode, the optical driving unit 140 outputs a recording pulse, which is an optical driving signal based on an input signal, according to a recording power value and parameters related to the generating of the recording pulse. The power value may be determined through an optimum power controlling (OPC) process for controlling recording power. The parameters related to the generating the recording pulse may be determined through a write strategy (WST) tuning control process. In a playback mode, the optical driving unit 140 outputs an optical driving signal for generating laser power at a constant level.

The encoder 150 converts data, which was converted to data in a particular recording format by the DSP 160, to a bit stream and outputs the bit stream to the optical driving unit 140.

The DSP 160 performs a signal processing for restoring a binary signal input by the R/F signal processor 130 to original data by using a phase-synchronized self-clock, and in a recording mode, performs a signal processing for converting input digital data to data in a particular recording format by adding an error-correcting code (ECC) thereto.

The servo control unit 190 generates a driving voltage for driving an actuator of the pickup 120 to control the pickup 120 in a horizontal direction or a vertical direction by using a tracking error signal or a focus error signal. The servo control unit 190 also generates a driving voltage for driving the sled motor 220 to move the pickup 120 to a target track, and generates a spindle motor control signal for controlling the spinning speed of the disc 110.

The driving unit 200 generates a driving current signal for driving the spindle motor 210 and sled motor 220 based on a control signal generated by the servo control unit 190. The driving unit 200 also generates a driving current for driving the actuator of the pickup 120 to control focusing and tracking of an optical lens of the pickup 120.

Information regarding recording power and WST information may be stored in the memory 170. The memory 170 may be a non-volatile memory, such as a flash memory, for example. Other suitable storage media may be used as well.

First group WST information, initially tuned based on universal disc identifications (IDs), second group WST information regarding non-universal discs, and default WST information may be classified and stored in the memory 170. For example, the first group WST information may include write strategies initially tuned with respect to IDs of generally used discs, respectively, during the manufacturing process of a disc drive. The second group WST information may include write strategies tuned with respect to discs, which are not generally used, respectively, through an optimum WST tuning control (OWC) process, in which the second group WST information is classified according to IDs of the discs and are stored in the memory 170. For example, it may be advantageous to limit regions, in which the second group WST information is stored, based on the capacity of the memory 170.

For example, storage space, in which WST information with respect to three types of non-universal discs may be stored, is allocated in the memory 170. After the WST information with respect to three types of non-universal discs is stored, a WST information tuned through an OWC process with respect to a non-universal disc is overwritten to a region, in which the least frequently accessed WST information with respect to a non-universal disc is stored, based on the frequencies of accessing the WST information.

Descriptions of write strategies are described below with reference to the example shown in FIG. 5.

Figure 5:
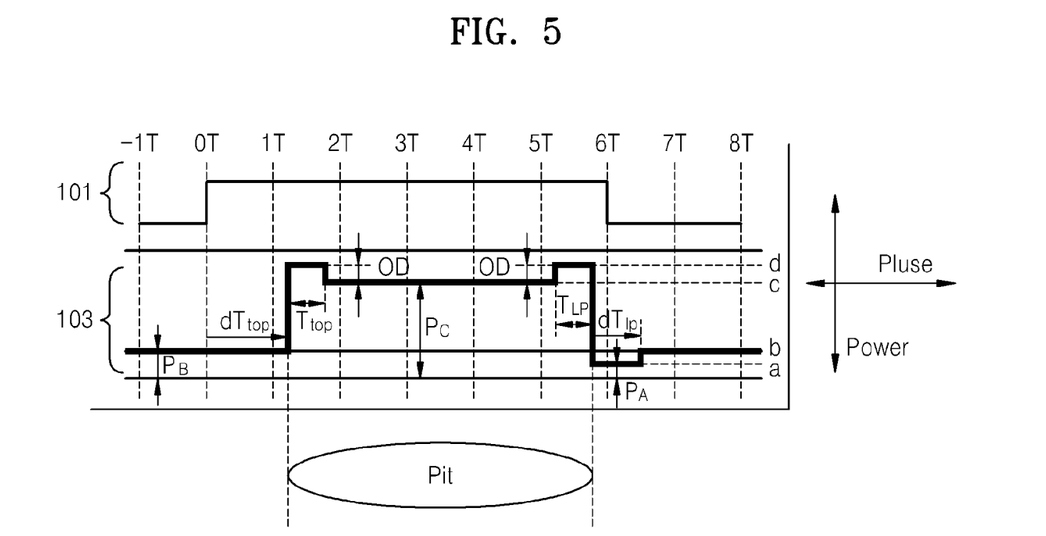
FIG. 5 is a diagram illustrating examples of waveforms for describing WST information.

FIG. 5 shows an example of WST information for generating a recording pulse 103 with respect to a 6T signal 101. The WST information may include power-related parameters and timing-related parameters. For example, the power-related parameters may include a peak power $P_C$, a bias power $P_B$, a cooling power $P_A$, and an overdrive power OD. The timing-related parameters may include a front overdrive width Ttop, a rear overdrive width $T_{LP}$, a rising edge delay dTtop, a falling edge delay dTlp.

Figure 2:
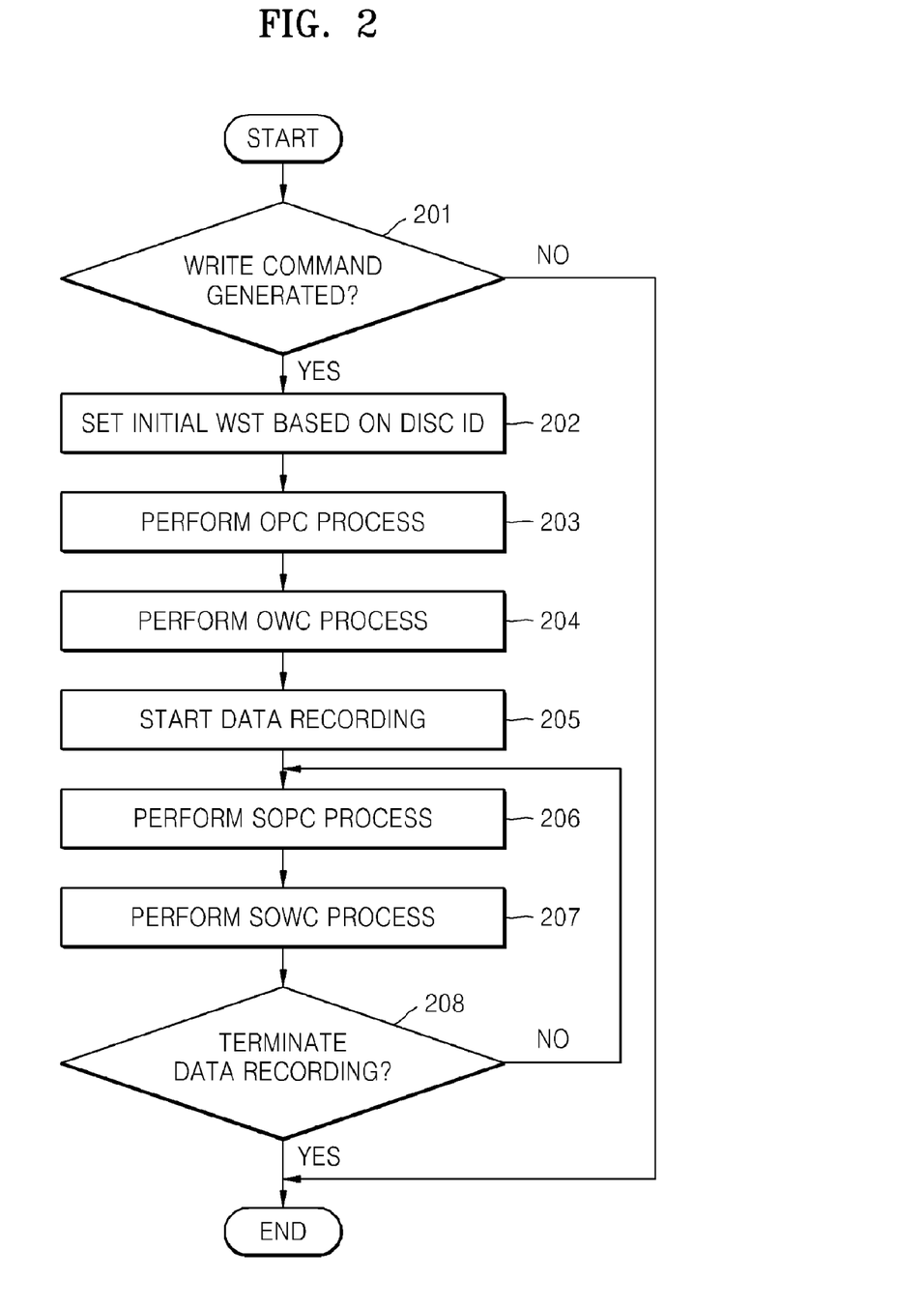
FIG. 2 is a flowchart illustrating an example of a method of controlling a recording operation.

The system control unit 180 controls overall operations of the optical disc drive and identifies type and ID of a loaded disc. As shown in FIG. 2, the system control unit 180 sets recording power and parameters related to the generation of recording pulses by successively performing an OPC process for adjusting recording power and an OWC process for adjusting parameters related to the generation of recording pulses prior to or during a recording operation. The system control unit also controls the optical disc drive to perform data recording based on the set recording power and the set parameters related to the generation of recording pulses.

The system control unit 180 includes a WST tuning control module 180-1 and a OPC module 180-2. The WST tuning control module 180-1 may perform optimization of WST, in which parameters related to the generation of recording pulses are set with respect to IDs of discs. The OPC module 180-2 may adjust and optimize recording power with respect to a disc to which data is to be recorded.

In one example, the WST tuning control module 180-1 and the OPC module 180-1 are included in the system control unit 180. However, the subject matter of this application is not limited thereto, and the WST tuning control module 180-1 and the OPC module 180-2 may be independent components separate from the system control unit 180.

A method of controlling a recording operation, wherein the method is executed by the system control unit 180 under the control of the optical disc drive, is described below with reference to the example in FIG. 2.

FIG. 2 illustrates an example of a method of controlling a recording operation. In this example, an optical disc drive determines whether a write command is generated or not in operation 201. A write command may be either received from a host apparatus (not shown) or generated by the system control unit 180 based on a function selecting signal received via a user input unit for inputting keys (not shown).

In an example in which a write command is generated, an initial WST is set based on disc ID read out from a disc, which is loaded in an optical disc drive for data recording.

For example, in an example in which WST information corresponding to a disc ID, read out from a disc to which data is to be recorded, is included in a first group WST information initially tuned based on IDs of universal discs, initially tuned WST information corresponding to the ID of the disc is read out from the memory 170 and an initial WST to be applied to an optical disc drive is set. Furthermore, in an example in which WST information corresponding to a disc ID read out from a disc to which data is to be recorded is included in a second group WST information tuned based on IDs of non-universal discs, WST information corresponding to the ID of the disc is read out from the memory 170 and an initial WST to be applied to an optical disc drive is set.

If WST information corresponding to a disc ID read out from a disc to which data is to be recorded is not included in the first group WST information initially tuned based on IDs of universal discs and the second group WST information tuned based on IDs of non-universal discs, default WST information is read out from the memory 170 and an initial WST to be applied to an optical disc drive is set.

As described above, after a process for setting initial WST of an optical disc drive is performed, an OPC process is performed in operation 203. For example, during the OPC process, parameters related to recording power are adjusted by recording test data in the test region of the disc 110 based on the initial WST set in operation 202, reproducing the recorded test data, and comparing recording power calculated based on a reproduced signal to target recording power.

Figure 6A:
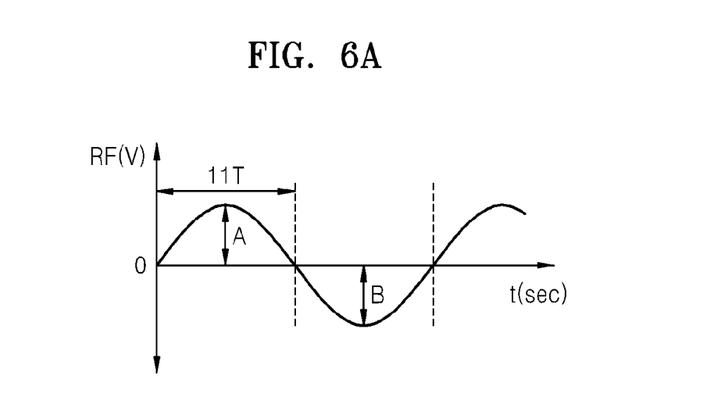
FIG. 6A is a diagram illustrating an example of reproduced signal waveforms.

For example, recording power may be calculated from a value of β, which is a factor indicating the vertical symmetry of the waveform of a reproduced signal, and in the waveform of a reproduced signal shown in FIG. 6A, the value of β is defined as defined below in Equation 1.

$$\beta = (A-B)/(A+B)$$ [Equation 1]

For example, A indicates the magnitude of the positive peak of a reproduced signal, whereas B indicates the magnitude of the negative peak of the reproduced signal.

Figure 6B:
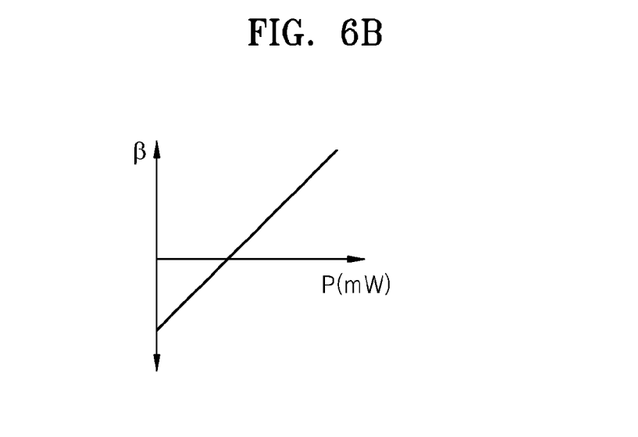
FIG. 6B is a graph illustrating an example of a relationship between values of β and recording power.

Furthermore, an example of the relationship between a value of β and recording power P is shown in FIG. 6B. Referring FIG. 6B, the relationship between a value of β and recording power P is a linear relationship. Therefore, recording power may be obtained from a graph as shown in FIG. 6B by calculating a value of β. In some examples, parameters related to recording power may be adjusted by comparing a calculated value of β and a target value of β.

After the OPC process is performed in operation 203, an OWC process is performed in operation 204.

Figure 3:
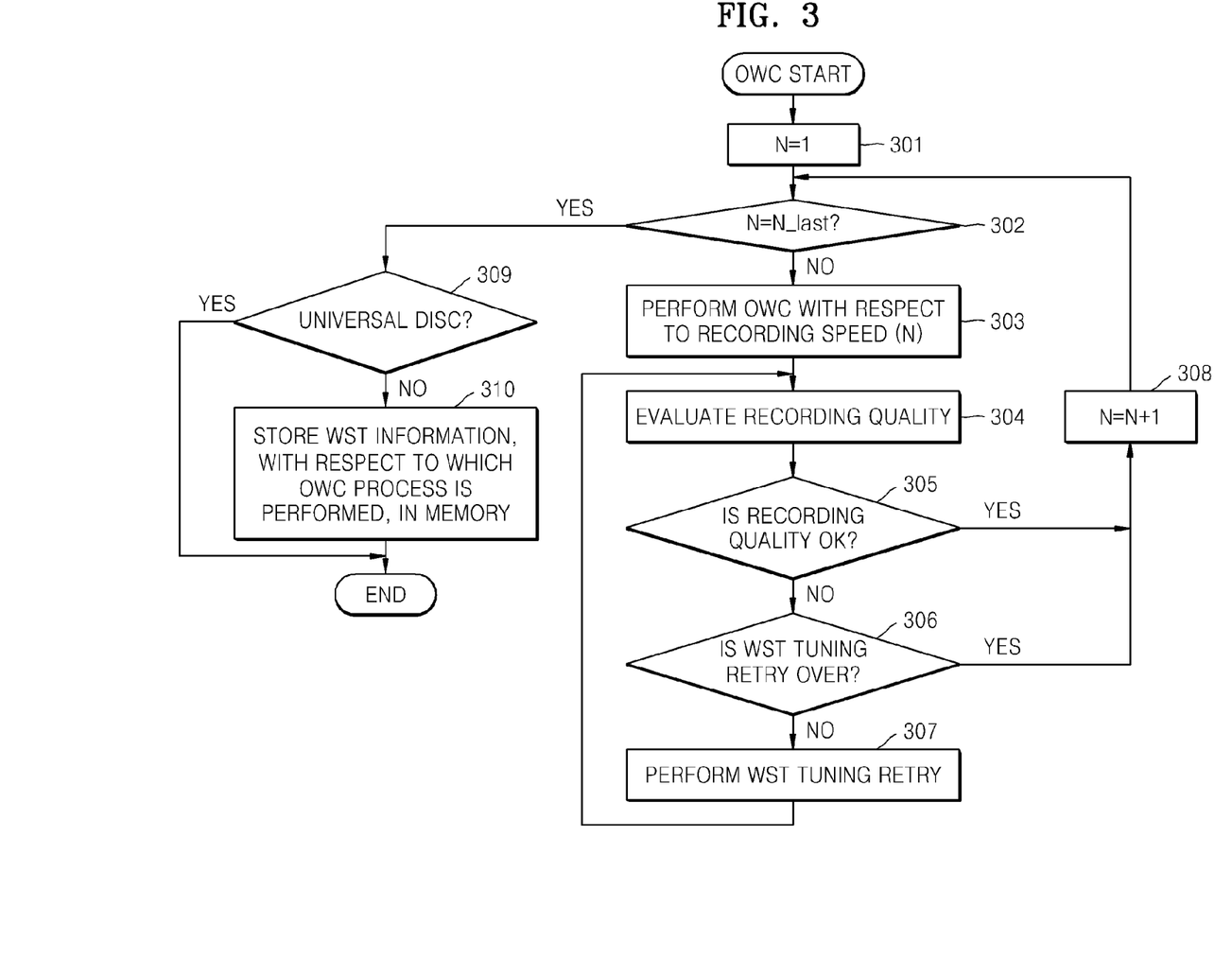
FIG. 3 is a flowchart illustrating an example of an optimum write strategy (WST) tuning control (OWC) process.

FIG. 3 illustrates an example of an OWC process. Referring to FIG. 3, an OWC process in operation 204 shown in FIG. 2 is described in detail.

When an OWC process is started, the initial value of a counter N (not shown) integrated in the system control unit 180 is set to 1 in operation 301). For example, the counter N indicates information regarding the recording speed of an optical disc drive. For example, the counter N may be used as information for selecting a particular recording speed between the minimum recording speed and the maximum recording speed. In other words, N=1 may indicate the minimum recording speed, N_last may indicate [(an N value indicating the maximum recording speed)+1], and a value between 1 and N_last−1 indicates a particular recording speed between the minimum recording speed and the maximum recording speed. For example, if it is determined that N_last=4, N=3 indicates the maximum recording speed. Furthermore, N=2 may be determined as an intermediate recording speed between the minimum recording speed and the maximum recording speed.

In operation 302, it is determined whether the value of the counter N is identical to the value of N_last or not.

If it is determined in operation 302 that the value of the counter N is not identical to the value of N_last, an OWC process with respect to a recording speed indicated by the value of the counter N is performed. For example, if N=1, an OWC operation with respect to the minimum recording speed is performed.

Recording quality is evaluated by reproducing recorded data after spinning the disc 110 at a recording speed indicated by the value of the counter N and recording test data in the test region of the disc 110 based on an initially set or adjusted WST in operation 304). For example, recording quality may be determined based on error rate or jitter. However, subject matter of the present application is not limited thereto, and other types of factors may also be used to evaluate recording quality.

In operation 305, it is determined whether recording quality exceeds a critical recording quality and is evaluated as OK or not.

If it is determined in operation 305 that the recording quality exceeds a critical recording quality, WST tuning with respect to the corresponding recording speed is terminated, and a value 1 is added to the value of the counter N (operation 308). At this point, WST information with respect to the corresponding recording speed is temporarily stored in a register (not shown) integrated in the system control unit 180. The operation in operation 302 is performed after the operation in operation 308 is performed.

Otherwise, if it is determined in operation 305 that the recording quality is below a critical recording quality, it is determined whether WST tuning retry at the corresponding recording speed is completed or not inoperation 306. In other words, it is determined whether all WST tuning retries have been performed at the corresponding recording speed are completed or not. If it is determined in operation 306 that WST tuning retry at the corresponding recording speed is completed, the method proceeds to operation 308.

Otherwise, if it is determined in operation 306 that WST tuning retry at the corresponding recording speed is not completed, WST tuning retry is performed in operation 307. In other words, either a single parameter of combinations of a plurality of parameters, which are required for generating recording pulses and are set based on WST, are adjusted.

After operation 307 is performed, operation 304 is performed based on the adjusted WST.

Otherwise, if it is determined in operation 302 that the value of the counter N is identical to the value of N_last, it is determined whether a disc with respect to which OWC process is performed is a universal disc or not inoperation 309. For example, the value of the counter N is identical to the value of N_last only when OWC process is performed with respect to all set recording speeds. If the ID information read out from the disc 110 is included in IDs corresponding to initially tuned first group WST information stored in the memory 170, the disc 110 is determined as a universal disc. Otherwise, the disc 110 is determined as a non-universal disc.

If it is determined in operation 309 that the disc 110 is a non-universal disc, an OWC process is performed, so that WST information temporarily stored in the register is stored in the memory 170 inoperation 310. For example, if the ID of a non-universal disc with respect to which an OWC process is performed is included in IDs corresponding to second group WST information stored in the memory 170, WST information corresponding to the particular ID is updated. However, if the ID of a non-universal disc with respect to which an OWC process is performed is not included in IDs corresponding to second group WST information stored in the memory 170, WST information with respect to the ID of the non-universal disc with respect to which the OWC process is performed is stored in the storage region of the memory 170 allocated to the second group WST, when available space of the storage region is enough. However, if available space of the storage region of the memory 170 is not enough, WST information with respect to the ID of the non-universal disc with respect to which the OWC process is performed is overwritten in the region in which WST information with respect to the least frequently accessed ID of a non-universal disc is stored.

As described above, the OWC process in operation 204 of FIG. 2 may be performed.

Referring back to the example in FIG. 2, processes after performing an OWC process are described below.

After performing the OWC process in operation 204, recording data in the data region of the disc 110 begins in operation 205.

While data is being recorded, an OPC process is performed based on initially set conditions. An OPC process performed based on initially set conditions after temporarily stopping data recording while data is recorded in the data region of the disc 110 will be referred to hereinafter as a skipping OPC (SOPC) process. For example, the initially set conditions may be set to perform a SOPC process at every predetermined interval, for example. In other words, when a SOPC process needs to be performed while data is being recorded in the data region of the disc 110, data recording is temporarily stopped, data recorded in the data region is reproduced, recording power calculated from reproduced signals and target recording power are compared, and recording power is adjusted based on the comparison. The adjustment of recording power may be performed based on a value of $\beta$ calculated from reproduced signals as described above with respect to operation 202.

After the SOPC process is performed in operation 206, a skipping OWC (SOWC) process is performed in operation 207). An OWC process performed based on initially set conditions after temporarily stopping data recording while data is recorded in the data region of the disc 110 may also be referred to as a SOWC process.

Figure 4:
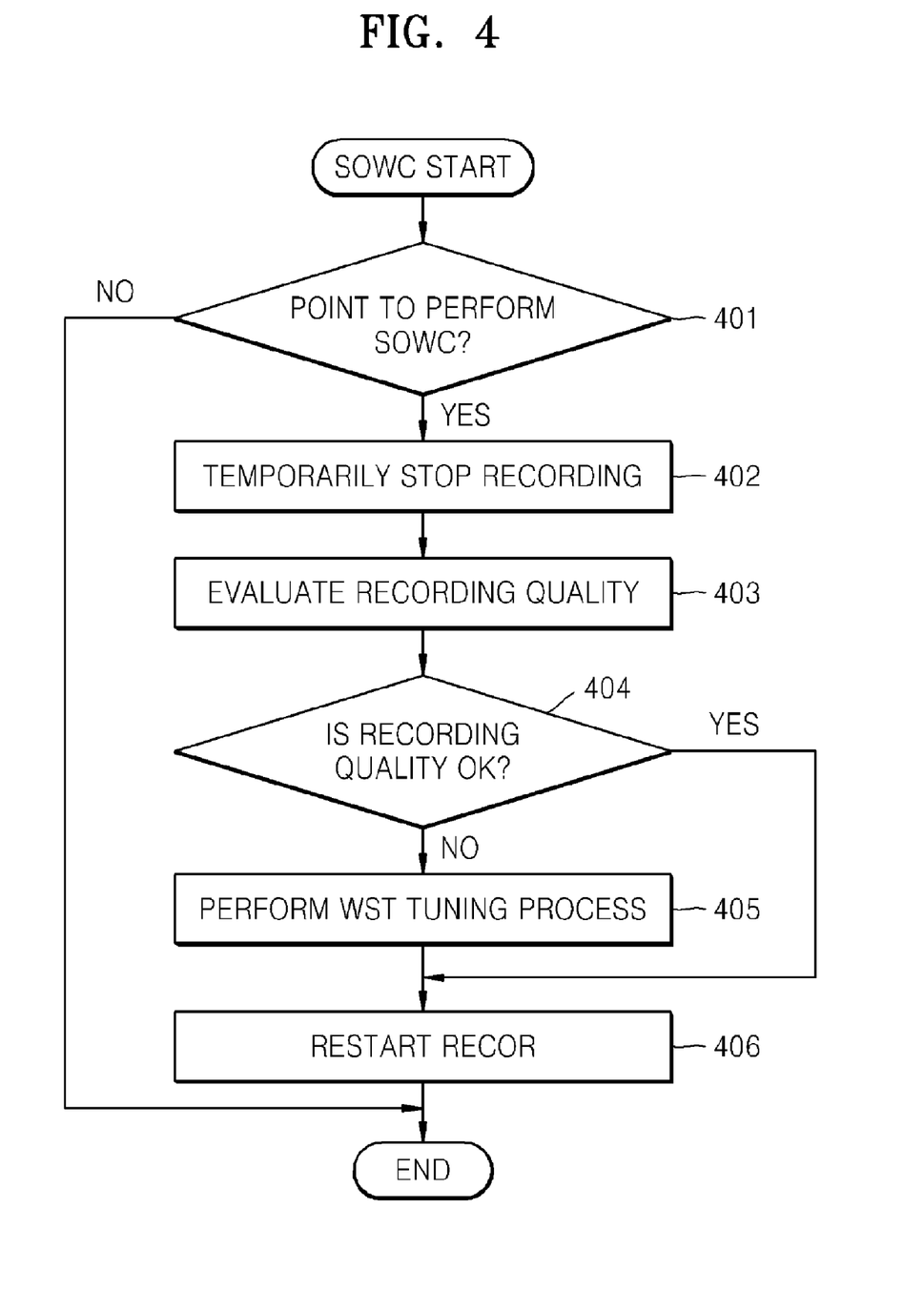
FIG. 4 is a flowchart illustrating an example of the skipping OWC (SOWC) process shown in FIG. 2.

FIG. 4 illustrates an example of an SOWC process.

Referring to FIG. 4, an SOWC process in operation 207 shown in FIG. 2 is described below.

The system control unit 180 determines whether a SOWC process needs to be performed in operation 401). A SOWC process may be set to be performed at the same intervals as something and successively after a SOPC process. Alternatively, a SOWC process and a SOPC process may be performed at different intervals.

If it is determined in operation 401 that a SOWC process is to be performed, signals recorded in the data region are reproduced to evaluate recording quality in operation 403. For example, recording quality may be determined based on error rate or jitter. However, embodiments are not limited thereto, and other types of factors may also be used to evaluate recording quality.

In operation 404, it is determined whether recording quality exceeds a critical recording quality and is evaluated as OK or not.

If it is determined in operation 404 that the recording quality is below a critical recording quality, a WST tuning process is performed in operation 405. In other words, if recording quality is below a critical recording quality, parameters related to the generation of recording pulses are adjusted, so that recording quality exceeds the critical recording quality. In one example, only parameters related to timings of recording pulses may be adjusted to reduce a period of time elapsed for performing the WST tuning process.

After operation 405 is performed, temporarily stopped data recording is re-started in operation 406.

Otherwise, if it is determined in operation 405 that the recording quality exceeds a critical recording quality, data recording in operation 406 is restarted immediately without performing the WST tuning process.

As described above, the SOWC process in operation 207 of FIG. 2 may be performed.

Referring back to the example in FIG. 2, processes after performing an SOWC process are described below.

After performing the OWC process in operation 207, it is determined whether data recording is completed by a write command or not in operation 208.

If it is determined in operation 208 that the data recording is completed, the process is terminated. Otherwise, the method proceeds back to operation 206.

As described above, the deterioration of recoding quality with respect to non-authentic discs and non-universal discs may be reduced or prevented by setting up recording power and parameters related to the generation of recording pulses by successively performing an OPC process for adjusting recording power and an OWC process for adjusting parameters related to the generation of recording pulses prior to or during a recording operation and by performing data recording based on the set recording power and the set parameters related to the generation of recording pulses. Furthermore, recording characteristic deviations based on factors, such as deviations of parts of an optical disc drive, adjustments, temperatures, or the like, may be reduced, so that recording quality may be improved.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM discs and DVDs; magneto-optical media, such as optical discs; and hardware devices that are specially configured to store and perform program instructions, such as read-only memory (ROM), random access memory (RAM), flash memory or the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a recording operation, the method comprising:
    setting recording power and parameters related to the generation of recording pulses for a disc by successively performing:
        an optimum power controlling (OPC) process for adjusting recording power; and
        an optimum write strategy (WST) tuning control (OWC) process for adjusting parameters related to the generation of recording pulses, determining whether the disc is a non-universal disc or a universal disc, and in response to determining that the disc is a non-universal disc, adjusting WST information corresponding to the disc based on the parameters adjusted by the OWC process; and
    performing data recording on the disc based on the set recording power and the set parameters related to the generation of recording pulses,
    wherein the adjusting of the WST information is based on whether an identification (ID) of the non-universal disc is included in a group of non-universal disc IDs stored in a memory.

2. The method of claim 1, wherein the OPC process and the OWC process are performed before data is recorded.

3. The method of claim 1, wherein the OPC process and the OWC process are successively performed prior to or during a recording operation.

4. The method of claim 1, wherein the data recording is temporarily stopped, recording quality is evaluated, and the OPC process and the OWC process are successively performed at every initially set interval.

5. The method of claim 1, wherein the initial WST, which is initially set before recording power and parameters related to the generation of recording pulses are adjusted, is determined based on the identification (ID) of a disc to which data is to be recorded.

6. The method of claim 1, wherein the OWC process is performed only when recording quality is below a critical recording quality.

7. The method of claim 6, wherein the recording quality is evaluated based on error rate or jitter detected by reproducing signals recorded in a disc.

8. The method of claim 1, wherein parameters related to recording power are adjusted based on a result of a comparison between recording power calculated based on a reproduced signal and target recording power during the OPC process.

9. The method of claim 8, wherein the recording power is calculated by using a factor indicating the vertical symmetry of the waveform of a reproduced signal, which is proportional to the intensity of light reflected by a disc.

10. The method of claim 1, wherein only parameters related to timings of recording pulses are adjusted when the OWC process is performed during data recording.

11. The method of claim 1, wherein the OWC process is performed in correspondence to a recording speed.

12. A computer-readable storage medium having recorded thereon a computer program for implementing a method, comprising:
    setting recording power and parameters related to the generation of recording pulses for a disc by successively performing:

an optimum power controlling (OPC) process for adjusting recording power; and an optimum write strategy (WST) tuning control (OWC) process for adjusting parameters related to the generation of recording pulses, determining whether the disc is a non-universal disc or a universal disc, and in response to determining that the disc is a non-universal disc, adjusting WST information corresponding to the disc based on the parameters adjusted by the OWC process; and performing data recording on the disc based on the set recording power and the set parameters related to the generation of recording pulses, wherein the adjusting of the WST information is based on whether an identification (ID) of the non-universal disc is included in a group of non-universal disc IDs stored in a memory.

13. An optical disc drive, comprising:

a memory configured to store information regarding recording power and optimum write strategy (WST); and a system control unit configured to control the optical disc drive to set recording power and parameters related to the generation of recording pulses for a disc by successively performing, prior to or during a recording operation, an optimum power controlling (OPC) process for adjusting recording power and the WST tuning control (OWC) process for adjusting parameters related to the generation of recording pulses, determine whether the disc is a non-universal disc or a universal disc, in response to determining that the disc is a non-universal disc, adjusting WST information corresponding to the disc based on the parameters adjusted by the OWC process, perform data recording based on the set recording power and the set parameters related to the generation of recording pulses, and wherein the adjusting of the WST information is based on whether an identification (ID) of the non-universal disc is included in a group of non-universal disc IDs stored in a memory.

14. The optical disc drive of claim 13, wherein the system control unit comprises:

a WST tuning control module configured to adjust parameters related to the generation of recording pulses based on recording quality; and an OPC module configured to compare recording power calculated based on a reproduced signal to target recording power and adjust recording power based on a result of the comparison.

15. The optical disc drive of claim 13, wherein first group WST information is initially tuned based on one or more of: universal disc identifications (IDs), second group WST information regarding non-universal discs, and default WST information that are classified and stored in the memory.

16. The optical disc drive of claim 13, wherein the system control unit is further configured to:

read out WST information corresponding to an identification (ID) of a disc, to which data is to be recorded, from the memory; and initially set parameters related to the generation of recording pulses before data is recorded in the disc.

17. The optical disc drive of claim 16, wherein, in response to WST information corresponding to a disc ID read out from a disc to which data is to be recorded not being stored in the memory, the system control unit is further configured to:

read out default WST information from the memory; and initially set parameters related to the generation of recording pulses.

18. The optical disc drive of claim 13, wherein the OWC process is performed only when recording quality is below a critical recording quality.

19. The optical disc drive of claim 18, wherein the recording quality is evaluated based on error rate or jitter detected by reproducing signals recorded in a disc.

20. The optical disc drive of claim 13, wherein parameters related to recording power are adjusted based on a result of comparison between recording power calculated based on a reproduced signal and target recording power during the OPC process.

21. The optical disc drive of claim 20, wherein the recording power is calculated by using a factor indicating the vertical symmetry of the waveform of a reproduced signal, which is proportional to the intensity of light reflected by a disc.

22. The optical disc drive of claim 13, wherein only parameters related to timings of recording pulses are adjusted when the OWC process is performed during data recording.

23. The optical disc drive of claim 13, wherein the OWC process is performed in correspondence to a recording speed.

24. The optical disc drive of claim 13, wherein WST with respect to a disc to which the OWC process is performed is stored in the memory only when the disc is not a universal disc.

25. A method of controlling a recording operation, the method comprising:

setting recording power and parameters related to the generation of recording pulses for a disc by successively performing:

an optimum power controlling (OPC) process for adjusting recording power; and an optimum write strategy (WST) tuning control (OWC) process for adjusting parameters related to the generation of recording pulses, determining whether the disc is a non-universal disc or a universal disc, and in response to determining that the disc is a non-universal disc, adjusting WST information corresponding to the disc based on the parameters adjusted by the OWC process; and performing data recording on the disc based on the set recording power and the set parameters related to the generation of recording pulses, wherein the adjusting the WST information comprises determining whether an identification (ID) of the non-universal disc is included in a group of non-universal disc IDs stored in a memory, and if the ID of the non-universal disc is included in the group, the adjusting further comprises updating the WST information corresponding to the non-universal disc ID based on the parameters adjusted by the OWC process.

26. The method of claim 25, wherein, in response to the ID of the non-universal disc not being included in the group of non-universal disc IDs, the adjusting further comprises storing the ID of the non-universal disc in the group of non-universal disc IDs and storing the parameters adjusted by the OWC process in the memory as WST information corresponding to the non-universal disc.

* * * * *